United States Patent
Tsunekawa

(10) Patent No.: US 7,464,206 B2
(45) Date of Patent: Dec. 9, 2008

(54) SEMICONDUCTOR DEVICE AND METHOD OF CONNECTING THE SAME

(75) Inventor: Tetsuji Tsunekawa, Tokyo (JP)

(73) Assignee: Kabushiki Kaisha Toshiba (JP)

( * ) Notice: Subject to any disclaimer, the term of this patent is extended or adjusted under 35 U.S.C. 154(b) by 338 days.

(21) Appl. No.: 11/370,384

(22) Filed: Mar. 2, 2006

(65) Prior Publication Data
US 2006/0218330 A1 Sep. 28, 2006

(30) Foreign Application Priority Data
Mar. 23, 2005 (JP) ............................. 2005-084115

(51) Int. Cl.
G06F 13/42 (2006.01)
G06F 3/00 (2006.01)

(52) U.S. Cl. .................... 710/105; 710/110; 327/50

(58) Field of Classification Search ................ 710/105, 710/106, 107, 110
See application file for complete search history.

(56) References Cited

U.S. PATENT DOCUMENTS

| | | | |
|---|---|---|---|
| 6,256,682 B1 | 7/2001 | Gudan et al. | |
| 6,593,768 B1 * | 7/2003 | Iyer et al. | 326/30 |
| 6,625,790 B1 * | 9/2003 | Casebolt et al. | 716/8 |
| 6,791,950 B2 * | 9/2004 | Wu | 370/257 |
| 6,833,738 B2 * | 12/2004 | Nakada | 327/58 |
| 6,871,252 B1 | 3/2005 | Cline | |
| 2002/0129180 A1 * | 9/2002 | Kitagawa | 710/105 |
| 2003/0206547 A1 * | 11/2003 | Cho | 370/364 |
| 2005/0097237 A1 * | 5/2005 | Ruping et al. | 710/15 |

* cited by examiner

*Primary Examiner*—Glenn A Auve
*Assistant Examiner*—Trisha Vu
(74) *Attorney, Agent, or Firm*—DLA Piper LLP (US)

(57) ABSTRACT

According to the present invention, there is provided a semiconductor device comprising:
  a power line to be externally supplied with a power supply voltage;
  a ground line for grounding;
  a first signal line for transmitting a first signal;
  a second signal line for transmitting a second signal;
  a first switching element and first resistance element connected in series between said first signal line and a power terminal which supplies a predetermined potential;
  a second switching element and second resistance element connected in series between said second signal line and said ground line; and
  a controller which is connected to said power line, said ground line, said first signal line, and said second signal line, and, when detecting that a potential of said power line has reached the power supply voltage, turns on said first switching element and said second switching element, and turns off said second switching element after an elapse of a predetermined time.

8 Claims, 6 Drawing Sheets

SEMICONDUCTOR DEVICE AND METHOD OF CONNECTING THE SAME

CROSS REFERENCE TO RELATED APPLICATION

This application is based upon and claims benefit of priority under 35 USC §119 from the Japanese Patent Application No. 2005-84115, filed on Mar. 23, 2005, the entire contents of which are incorporated herein by reference.

BACKGROUND OF THE INVENTION

The present invention relates to a semiconductor device and a method of connecting the same.

Recently, a universal serial bus (USB) is used as an interface standard for connecting a personal computer to peripheral devices such as a keyboard and mouse. This USB can connect peripheral devices in the form of a tree via a hub, thereby connecting a maximum of 127 peripheral devices by one port.

The USB also has a so-called hot plug function by which cables can be connected and disconnected with the power supply being kept on.

Devices connected to this USB can be classified into a host such as a personal computer which controls the whole system, a hub which relays data transfer, and devices as peripheral equipment which operate under the control of the host.

In addition, the USB has four signal lines, i.e., a power line VBUS which supplies a power supply voltage of, e.g., 5 V, a ground line GND for grounding, a data plus line DP, and a data minus line DM, and performs differential signal transmission by using the data plus line DP and data minus line DM.

The USB defines a full speed of 12 Mbits/sec and a low speed of 1.5 Mbits/sec as the data transfer speeds of devices. Therefore, the USB is connected to both devices (e.g., a printer and hard disk drive) which operate at a full speed of 12 Mbits/sec, and devices (e.g., a mouse and keyboard) which operate at a low speed of 1.5 Mbits/sec. The host or hub performs data transfer corresponding to the data transfer speed of a connected device.

Accordingly, the host/hub must identify whether the connected device is a device which operates at the full speed or a device which operates at the low speed.

When a device is connected, the host/hub checks whether the data transfer speed of the connected device is the full speed or low speed, on the basis of the potentials of the data plus line DP and data minus line DM. However, the data transfer speed is sometimes incorrectly judged owing to noise generated on the data plus line DP and data minus line DM.

SUMMARY OF THE INVENTION

According to one aspect of the invention, there is provided a semiconductor device comprising:

a power line to be externally supplied with a power supply voltage;

a ground line for grounding;

a first signal line for transmitting a first signal;

a second signal line for transmitting a second signal;

a first switching element and first resistance element connected in series between said first signal line and a power terminal which supplies a predetermined potential;

a second switching element and second resistance element connected in series between said second signal line and said ground line; and a controller which is connected to said power line, said ground line, said first signal line, and said second signal line, and, when detecting that a potential of said power line has reached the power supply voltage, turns on said first switching element and said second switching element, and turns off said second switching element after an elapse of a predetermined time.

According to one aspect of the invention, there is provided a semiconductor device connecting method of connecting, to a predetermined device, a semiconductor device comprising a power line to be externally supplied with a power supply voltage, a ground line for grounding, a first signal line for transmitting a first signal, a second signal line for transmitting a second signal, a first switching element and first resistance element connected in series between the first signal line and a power terminal which supplies a predetermined potential, and a second switching element and second resistance element connected in series between the second signal line and the ground line, comprising:

turning on the first switching element and the second switching element when it is detected that a potential of the power line has reached the power supply voltage; and turning off the second switching element after an elapse of a predetermined time.

DETAILED DESCRIPTION OF THE INVENTION

Embodiments of the present invention will be described below with reference to the accompanying drawings.

(1) First Embodiment

Figure 1:
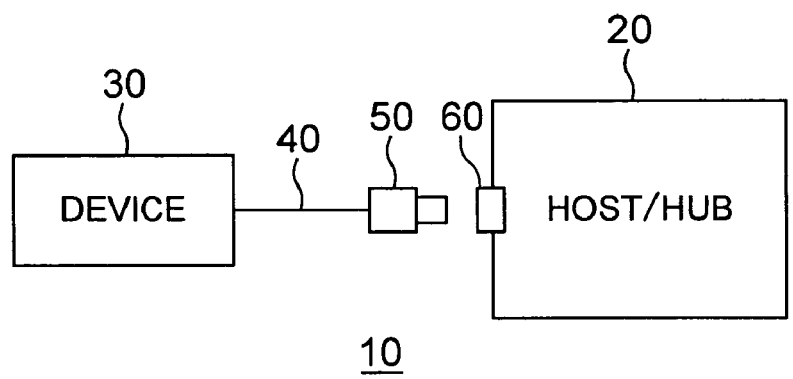
FIG. 1 is a block diagram showing the configuration of a computer system according to the first embodiment of the present invention.

FIG. 1 shows the configuration of a computer system 10 according to the first embodiment of the present invention. The computer system 10 has a host which controls the whole system, a hub which relays data transfer, and a peripheral device which operates under the control of the host. In this embodiment, a case in which a host/hub 20 equivalent to the host or hub and a device 30 equivalent to the peripheral device are connected will be explained.

Examples of the host are a personal computer and PDA (Personal Digital Assistance: a portable information terminal), and examples of the device are a keyboard, mouse, printer, and hard disk drive.

A device-side connector 50 is attached to the device 30 via a cable 40, and the host/hub 20 has a host/hub-side connector 60. The host/hub 20 and device 30 are electrically connected by connecting the device-side connector 50 to the host/hub-side connector 60.

The computer system 10 uses a USB as an interface standard for connecting the host/hub 20 and device 30. The USB has four signal lines, i.e., a power line VBUS for supplying a power supply voltage of, e.g., 5 V, a ground line GND for grounding, a data plus line DP, and a data minus line DM, and performs differential signal transmission by using the data plus line DP and data minus line DM. Note that at least four signal lines need only be formed.

Figure 2:
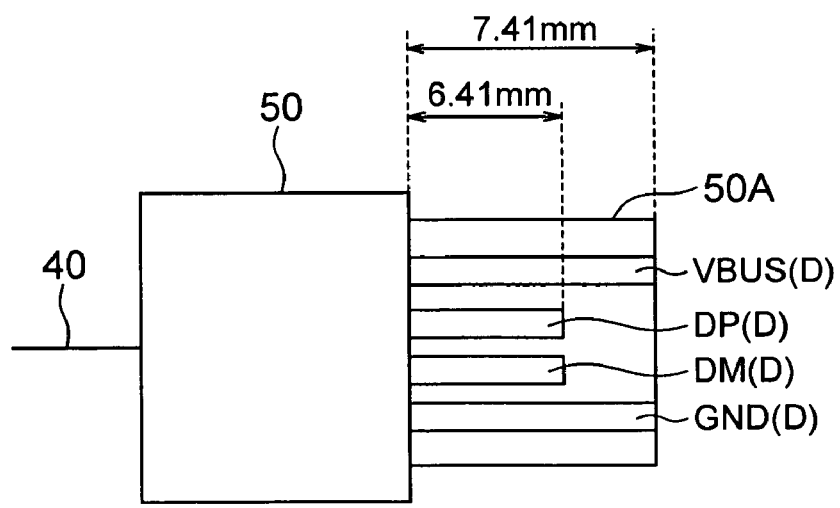
FIG. 2 is a longitudinal sectional view showing the sectional structure of the distal end portion of a device-side connector.

To connect the device 30 to the host/hub 20, it is necessary to first supply the power supply voltage from the host/hub 20 to the device 30. For this purpose, as shown in FIG. 2, in a distal end portion 50A of the device-side connector 50, the distal ends of a device-side data plus line DP(D) and device-side data minus line DM(D) are formed closer to the cable 40 than those of a device-side power line VBUS(D) and device-side ground line GND(D).

For example, the length of the device-side power line VBUS(D) and device-side ground line GND(D) is 7.41 mm, and that of the device-side data plus line DP(D) and device-side data minus line DM(D) is 6.41 mm.

Note that a host/hub-side power line VBUS(H), host/hub-side data plus line DP(H), host/hub-side data minus line DM(H), and host/hub-side ground line GND(H) (none of them is shown) are formed in the distal end portion of the host/hub-side connector 60, but the distal ends of these lines are formed in substantially the same position.

Figure 3:
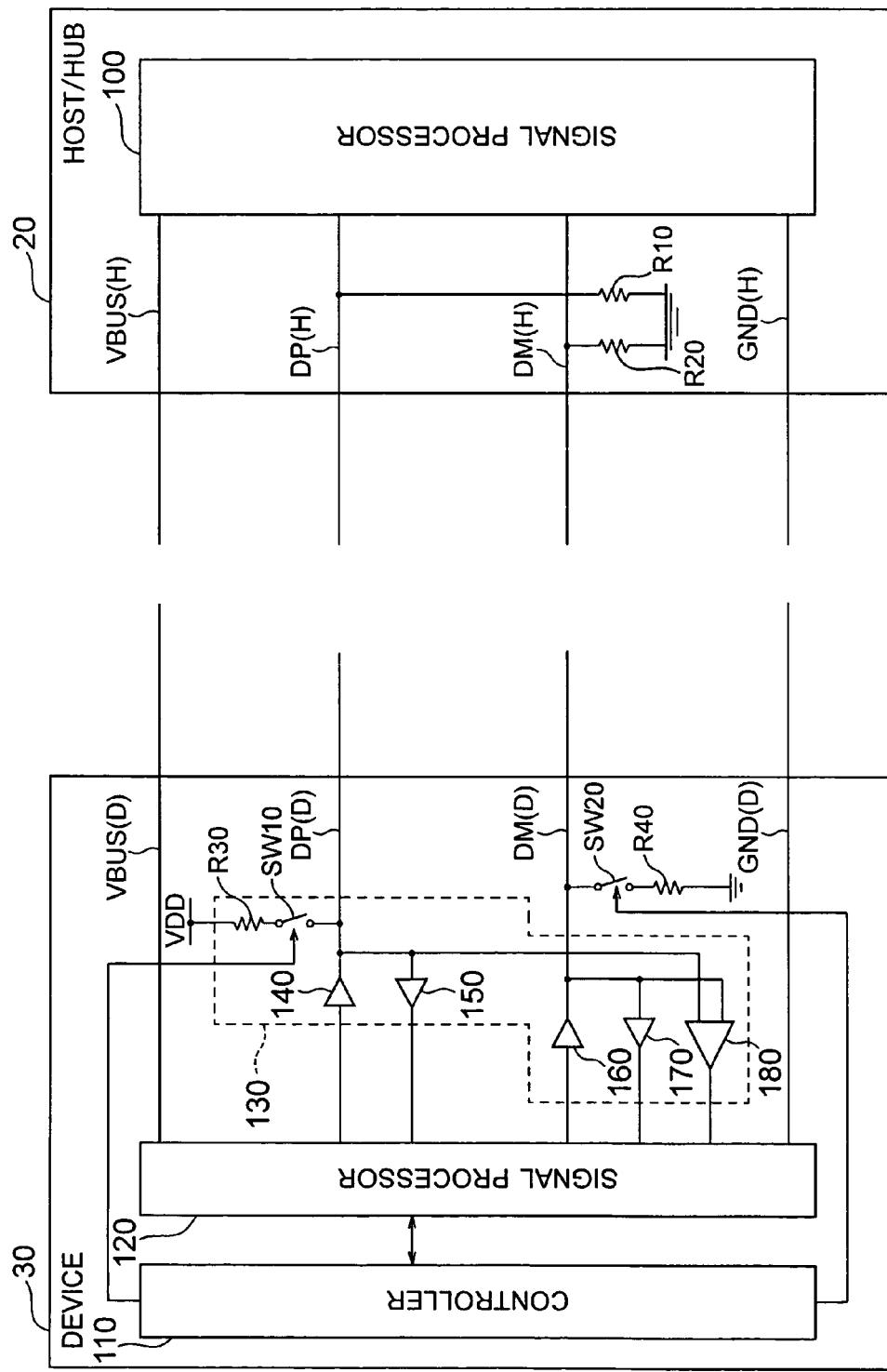
FIG. 3 is a circuit diagram showing the configuration of the computer system.

FIG. 3 shows practical circuit configurations of the host/hub 20 and device 30. The host/hub 20 has a signal processor 100 which controls the whole computer system 10. The signal processor 100 is connected to the host/hub-side power line VBUS(H) for supplying a power supply voltage of 5 V to the device 30, the host/hub-side ground line GND(H) for grounding, the host/hub-side data plus line DP(H), and the host/hub-side data minus line DM(H), and performs differential signal transmission by using the host/hub-side data plus line DP(H) and host/hub-side data minus line DM(H).

The host/hub-side data plus line DP(H) is grounded via, e.g., a 15-kΩ pull-down resistor (a resistor which is connected to keep the potential stable) R10. Likewise, the host/hub-side data minus line DM(H) is grounded via, e.g., a 15-kΩ pull-down resistor R20.

The device 30 has a controller 110 for controlling the whole device 30, a signal processor 120 for performing predetermined signal processing, and an I/O circuit 130 for inputting and outputting data signals.

In this embodiment, the device 30 operates at the full speed. Therefore, of the device-side data plus line DP(D) and device-side data minus line DM(D), the device-side data plus line DP(D) is connected to a 3.3-V power terminal VDD via a switch SW10 and, e.g., a 1.5-kΩ pull-up resistor (a resistor which is connected to keep the potential stable) R30 in this order.

Accordingly, when the device-side data plus line DP(D) is connected to the host/hub-side data plus line DP(H), the potential of the host/hub-side data plus line DP(H) rises to 2 V or more, and this makes it possible to notify the host/hub 20 that the device 30 operates at the full speed.

Also, the device-side data minus line DM(D) is grounded via a switch SW20 and resistor R40 in this order. Therefore, when the device-side power line VBUS(D) is connected to the host/hub-side power line VBUS(H), electric charge stored in the device-side data minus line DM(D) can be removed to the ground by turning on the switch SW20. In this manner, it is possible to prevent the host/hub 20 from incorrectly judging the data transfer speed of the connected device 30.

Note that the device-side data minus line DM(D) may also be grounded via the switch SW20 and a transistor in this order.

The I/O circuit 130 has the switch SW10 and pull-up resistor R30 described above, and also has I/O buffers 140 to 170 and a comparator 180.

Figure 4:
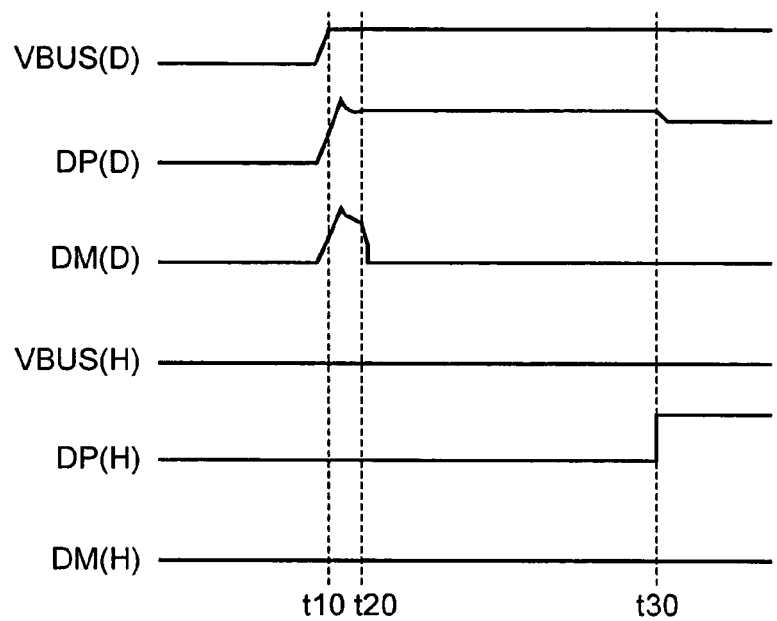
FIG. 4 is a timing chart when a device is connected to a host/hub by using a connection method according to the first embodiment.

FIG. 4 shows an example of a timing chart when the device 30 is connected to the host/hub 20. First, the power supply of the host/hub 20 is turned on to set the potential of the host/hub power line VBUS(H) at, e.g., 5 V.

To connect the device 30 to the host/hub 20 in this state, the device-side power line VBUS(D) is connected to the host/hub-side power line VBUS(H), and the device-side ground line GND(D) is connected to the host/hub-side ground line GND(H), thereby changing the potential of the device-side power line VBUS(D) from 0 V to 5 V (time t10).

In this case, neither the device-side data plus line DP(D) nor the device-side data minus line DM(D) is connected, so each line is in an open (high-impedance) state.

When the power supply voltage is supplied from the host/hub-side power line VBUS(H) to the device-side power line VBUS(D), therefore, electric charge is stored in the device-side data plus line DP(D) and device-side data minus line DM(D), so the potentials of the device-side data plus line DP(D) and device-side data minus line DM(D) rise (time t10).

When the controller 110 of the device 30 detects that the potential of the device-side power line VBUS(D) has changed from 0 V to 5 V, it turns on the switch SW10 to stabilize the potential of the device-side data plus line DP(D) (time t20).

At the same time, the controller 110 turns on the switch SW20 to remove the electric charge stored in the device-side data minus line DM(D) to the ground via the resistor R40, thereby setting the potential of the device-side data minus line DM(D) at 0 V (time t20). After that, the controller 110 turns off the switch SW20 at a predetermined timing.

When the device-side data plus line DP(D) is connected to the host/hub-side data plus line DP(H), the potential of the host/hub-side data plus line DP(H) rises from 0 V to about 3 V (the voltage dividing ratio of the pull-down resistor R10 to the pull-up resistor R30) (time t30).

On the other hand, even when the device-side data minus line DM(D) is connected to the host/hub-side data minus line DM(H), no electric charge is stored in the device-side data minus line DM(D), so no electric charge is removed to the ground via the resistor R20.

In this way, it is possible to prevent the potential of the host/hub-side data minus line DM(H) from instantaneously rising to generate a pulse, so this potential is maintained at 0 V (time t30).

The signal processor 100 of the host/hub 20 measures the potentials of the host/hub-side data plus line DP(H) and host/hub-side data minus line DM(H) for, e.g., 2.5 μsec or more. If the potential of either the host/hub-side data plus line DP(H) or the host/hub-side data minus line DM(H) is 2 V or more, the signal processor 100 determines that the device 30 is connected.

Subsequently, if the potential of the host/hub-side data plus line DP(H) changes to 2 V or more, the signal processor 100 determines that the device 30 which operates at the full speed is connected. If the potential of the host/hub-side data minus line DM(H) changes to 2 V or more, the signal processor 100 determines that a device which operates at the low speed is connected.

In this embodiment, when the potential of the host/hub-side data plus line DP(H) changes to 2 V or more, the signal processor 100 determines that the device 30 which operates at the full speed is connected.

In this case, the potential of the host/hub-side data minus line DM(H) does not instantaneously change to 2 V or more. This makes it possible to prevent the host/hub 20 from incorrectly determining that the data transfer speed of the connected device 30 is the low speed.

After that, the host/hub 20 performs data transfer with the connected device 30 at the full speed.

Figure 5:
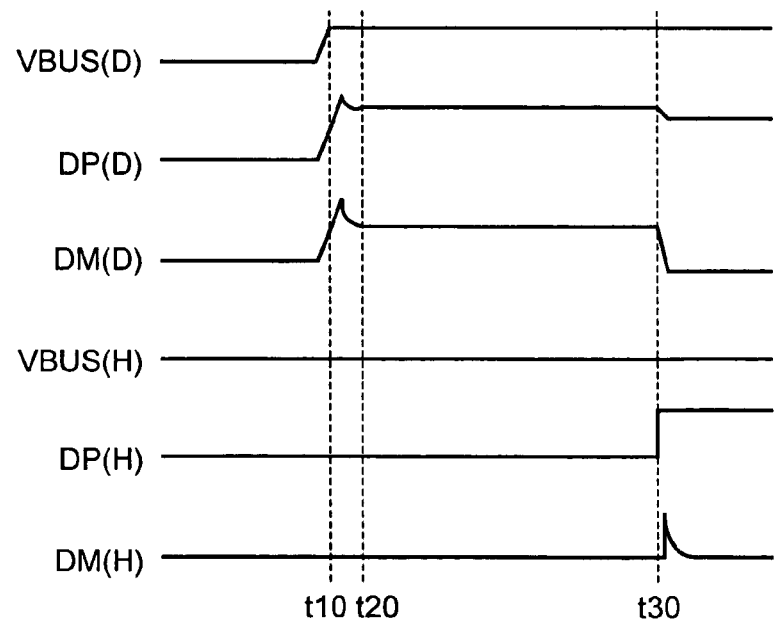
FIG. 5 is a timing chart when a device is connected to a host/hub by using a connection method according to a comparative example.

FIG. 5 shows, as a comparative example, an example of a timing chart when the device 30 is connected to the host/hub 20, while the switch SW20 is not turned on but kept off, even if the potential of the device-side power line VBUS(D) changes to 5 V.

In this comparative example, the device-side data minus line DM(D) in which electric charge is stored is connected to the host/hub-side data minus line DM(H). Upon connection, therefore, this stored electric charge is removed to the ground via the pull-down resistor R20 connected to the host/hub-side data minus line DM(H) (time t30).

As a consequence, the potential of the host/hub-side data minus line DM(H) sometimes rises in a moment to generate a pulse having a potential of, e.g., 2 V or more (time t30). In this case, the signal processor 100 of the host/hub 20 detects that the potential of the host/hub-side data minus line DM(H) changes to 2 V or more, and incorrectly determines that a device which operates at the low speed is connected.

In this case, it is sometimes possible to prevent the incorrect judgment on the data transfer speed of the device by turning on the switch SW10 at a timing later than time t20. However, if the speed when the device 30 is connected to the host/hub 20 is low, the timing at which the potential of the host/hub-side data minus line DM(H) rises in an instant sometimes overlaps the timing at which the potential of the host/hub-side data plus line DP(H) rises. This causes incorrect judgment on the data transfer speed of the device.

By contrast, this embodiment can prevent incorrect judgment on the data transfer speed of a connected device.

Note that the first embodiment described above is an example and does not limit the present invention. For example, when a device in which the device-side data minus line DM(D) is connected to the power terminal VDD via a switch and pull-up resistor and which operates at the low speed is to be connected to the host/hub 20, the device-side data plus line DP(D) need only be grounded via a switch and resistor.

(2) Second Embodiment

Figure 6:
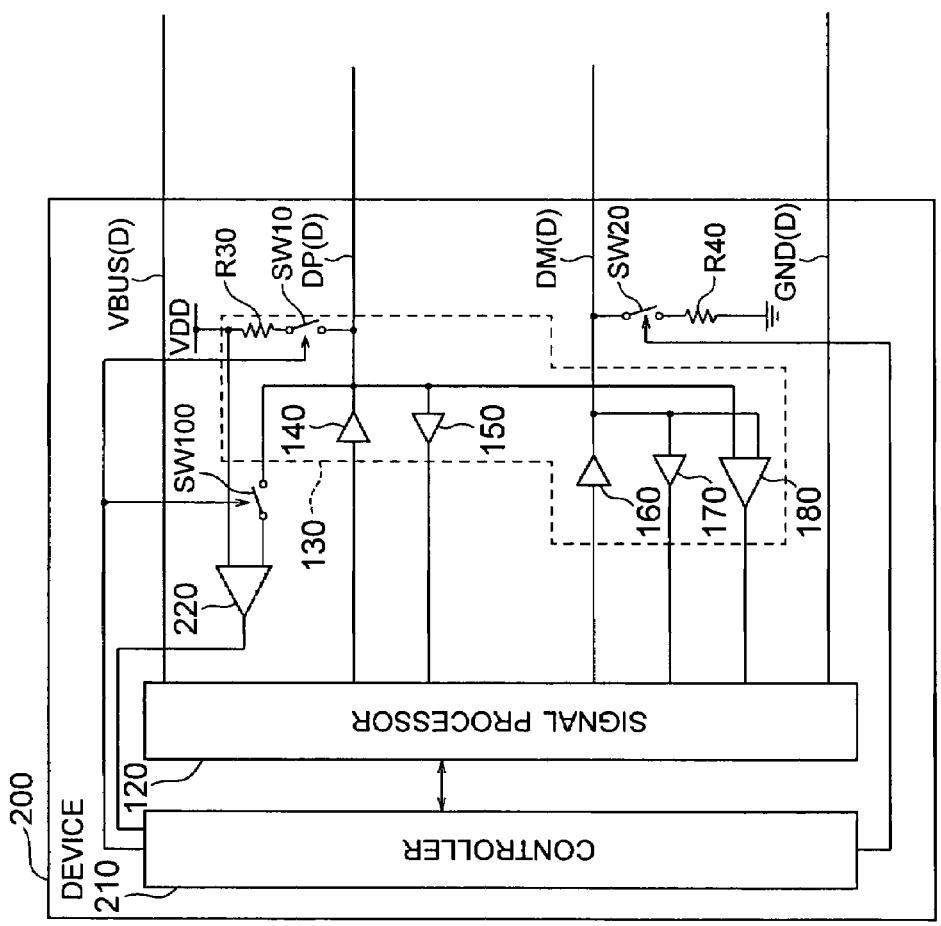
FIG. 6 is a circuit diagram showing the arrangement of a device according to the second embodiment.
Figure 7:
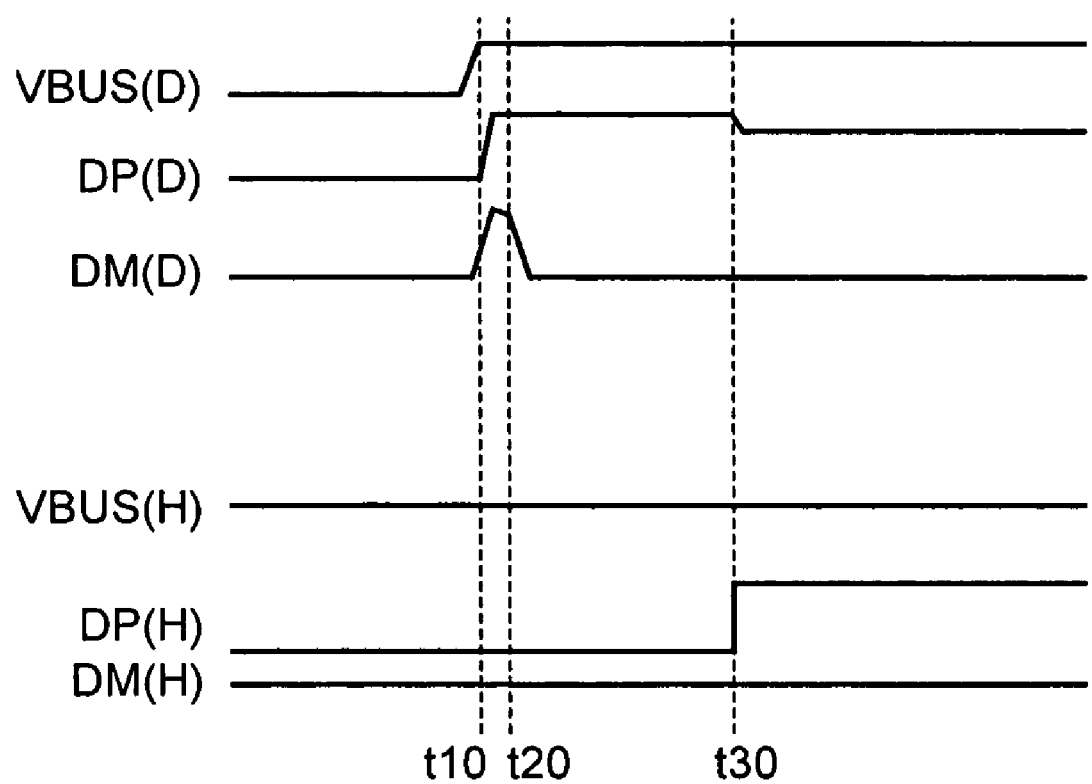
FIG. 7 is a timing chart when a device is connected to a host/hub by using a connection method according to the second embodiment.

FIG. 6 shows the arrangement of a device 200 according to the second embodiment of the present invention. FIG. 7 shows an example of a timing chart when the device 200 is connected to a host/hub 20. Note that the same reference numerals as in FIG. 3 denote the same elements, and an explanation thereof will be omitted.

The device 200 has a comparator 220 having a first input terminal connected to a power terminal VDD, a second input terminal connected to a device-side data plus line DP(D) via a switch SW100, and an output terminal connected to a controller 210.

In this embodiment, when the controller 210 detects that a device-side power line VBUS(D) is connected to a host/hub-side power line VBUS(H) and the potential of the device-side power line VBUS(D) changes to 5 V (time t10), it turns on switches SW10 and SW20 and also turns on the switch SW100 (time t20).

The comparator 220 compares the potential of the power terminal VDD as a reference potential with that of the device-side data plus line DP(D). Since the potential of the device-side data plus line DP(D) is not lower than that of the power terminal VDD, the comparator 220 outputs "L" level to the controller 210.

When the device-side data plus line DP(D) is connected to a host/hub-side data plus line DP(H) in this state, the potential of the device-side data plus line DP(D) lowers by about 3 V (the voltage dividing ratio of a pull-down resistor R10 to a pull-up resistor R30) (time t30).

When the potential of the device-side data plus line DP(D) thus changes to a potential lower than that of the power terminal VDD, the comparator 220 outputs "H" level to the controller 210. When given "H" level from the comparator 220, the controller 210 turns off the switches SW20 and SW100.

In this embodiment as described above, as in the first embodiment, the potential of a host/hub-side data minus line DM(H) does not instantaneously change to 2 V or more. This makes it possible to prevent the host/hub 20 from incorrectly determining that the data transfer speed of the connected device 200 is the low speed.

Also, in this embodiment, the switch SW20 is turned off on the basis of the timing at which the device-side data plus line DP(D) is connected to the host/hub-side data plus line DP(H). Therefore, even if a circuit element not defined by a USB is added, communications based on this USB are not adversely affected.

Note that the second embodiment described above is an example and does not limit the present invention. For example, when a device in which a device-side data minus line DM(D) is connected to the power terminal VDD via a switch and pull-up resistor and which operates at the low speed is to be connected to the host/hub 20, it is only necessary to ground the device-side data plus line DP(D) via a switch and resistor, and connect the second input terminal of the comparator to the device-side data minus line DM(D) via a switch.

(3) Third Embodiment

Figure 8:
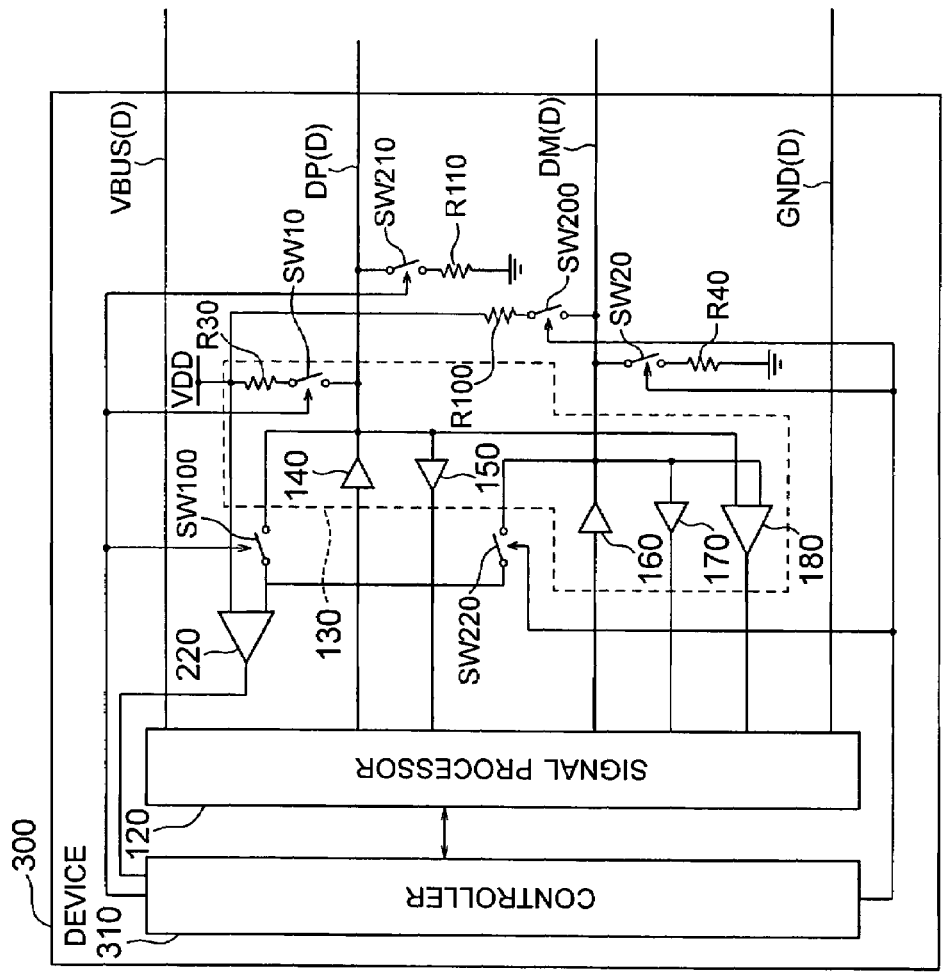
FIG. 8 is a circuit diagram showing the arrangement of a device according to another embodiment.

Note that each embodiment described above is an example and does not limit the present invention. For example, as shown in FIG. 8, a device 300 for which the full speed or low speed can be selected as the data transfer speed may also be connected to a host/hub 20.

In this case, to operate the device 300 at the full speed, a device-side data plus line DP(D) is connected to a power terminal VDD via a switch SW10 and pull-up resistor R30, a device-side data minus line DM(D) is grounded via a switch SW20 and resistor R40, and a second input terminal of a comparator 220 is connected to the device-side data plus line DP(D) via a switch SW100.

To operate the device 300 at the low speed, the device-side data minus line DM(D) is connected to the power terminal VDD via a switch SW200 and pull-up resistor R100, the device-side data plus line DP(D) is grounded via a switch SW210 and resistor R110, and the second input terminal of the comparator 220 is connected to the device-side data minus line DM(D) via a switch SW220.

When the device 300 is to be operated at the full speed, therefore, the ON/OFF operations of the switches SW10, SW20, and SW100 need only be controlled by a controller 310, while the switches SW200, SW210, and SW220 are kept off.

When the device 300 is to be operated at the low speed, the ON/OFF operations of the switches SW200, SW210, and SW220 need only be controlled by the controller 310, while the switches SW10, SW20, and SW100 are kept off.

As described above, in the semiconductor device and the method of connecting the same according to any of the above embodiments, it is possible to prevent incorrect judgment on the data transfer speed of the semiconductor device connected to a predetermined device.

What is claimed is:

1. A semiconductor device comprising:
    a power line to be externally supplied with a power supply voltage;
    a ground line for grounding;
    a first signal line for transmitting a first signal;
    a second signal line for transmitting a second signal;
    a first switching element and a first resistance element connected in series between said first signal line and a power terminal which supplies a predetermined potential;
    a second switching element and a second resistance element connected in series between said second signal line and said ground line;
    a controller which is connected to said power line, said ground line, said first signal line, and said second signal line, and, when detecting that a potential of said power line has reached the power supply voltage, turns on said first switching element and said second switching element, and turns off said second switching element after an elapse of a predetermined time; and
    a second comparator having a first input terminal connected to said power terminal, a second input terminal connected to said first signal line via a third switching element, and an output terminal connected to said controller,
    wherein said controller turns on said first switching element, said second switching element, and said third switching element, when detecting that the potential of said power line has reached the power supply voltage,
    said second comparator compares a potential of said power terminal with a potential of said first signal line, and outputs a comparison result to said controller, and
    said controller turns off said second switching element and said third switching element, when detecting that the comparison result output from said second comparator has changed.

2. A device according to claim 1, wherein said power line, said ground line, said first signal line, and said second signal line are connected to a connector based on a USB standard via a cable.

3. A device according to claim 1, further comprising a signal processor which is
    connected to said power line and said ground line,
    connected to said first signal line via a first output buffer, and connected to said first signal line in parallel with said first output buffer via a first input buffer,
    connected to said second signal line via a second output buffer, and connected to said second signal line in parallel with said second output buffer via a second input buffer, and
    connected to a first comparator which compares a potential of said first signal line with a potential of said second signal line, and outputs a comparison result.

4. A semiconductor device comprising:
    a power line to be externally supplied with a power supply voltage;
    a ground line for grounding;
    a first signal line for transmitting a first signal
    a second signal line for transmitting a second signal;
    a first switching element and a first resistance element connected in series between said first signal line and a power terminal which supplies a predetermined potential;
    a second switching element and a second resistance element connected in series between said second signal line and said ground line;
    a controller which is connected to said power line, said ground line, said first signal line, and said second signal line, and, when detecting that a potential of said power line has reached the power supply voltage, turns on said first switching element and said second switching element, and turns off said second switching element after an elapse of a predetermined time; and
    a fourth switching element and third resistance element connected in series between said second signal line and said power terminal; and
    a fifth switching element and a fourth resistance element connected in series between said first signal line and said ground line,
    wherein said controller turns on said first switching element and said second switching element, and turns off said second switching element after an elapse of a predetermined time, when detecting that the potential of said power line has reached the power supply voltage, while said fourth switching element and said fifth switching element are kept off, and
    turns on said fourth switching element and said fifth switching element, and turns off said fifth switching element after an elapse of a predetermined time, when detecting that the potential of said power line has reached the power supply voltage, while said first switching element and said second switching element are kept off.

5. A device according to claim 4, wherein said power line, said ground line, said first signal line, and said second signal line are connected to a connector based on a USB standard via a cable.

6. A device according to claim 4, further comprising a signal processor which is
    connected to said power line and said ground line,
    connected to said first signal line via a first output buffer, and connected to said first signal line in parallel with said first output buffer via a first input buffer,
    connected to said second signal line via a second output buffer, and connected to said second signal line in parallel with said second output buffer via a second input buffer, and
    connected to a first comparator which compares a potential of said first signal line with a potential of said second signal line, and outputs a comparison result.

7. A semiconductor device connecting method, of connecting, to a predetermined device, a semiconductor device comprising:
    a power line to be externally supplied with a power supply voltage,
    a ground line for grounding,
    a first signal line for transmitting a first signal, a second signal line for transmitting a second signal, a first switching element and first resistance element connected in series between the first signal line and a power terminal which supplies a predetermined potential, and a second switching element and second resistance element connected in series between the second signal line and the ground line, the method comprising:

turning on the first switching element and the second switching element when it is detected that a potential of the power line has reached the power supply voltage; and turning off the second switching element after an elapse of a predetermined time;

wherein the semiconductor device further comprises a comparator having a first input terminal connected to the power terminal, and a second input terminal connected to the first signal line via a third switching element, when the first switching element and the second switching element are to be turned on, the first switching element, the second switching element, and the third switching element are turned on if it is detected that the potential of the power line has reached the power supply voltage, and when the second switching element is to be turned off, the potential of the power terminal is compared with a potential of the first signal line, and, if it is detected that a comparison result has changed, the second switching element and the third switching element are turned off.

8. A method according to claim 7, wherein the semiconductor device further comprises a fourth switching element and a third resistance element connected in series between the second signal line and the power terminal, and a fifth switching element and a fourth resistance element connected in series between the first signal line and the ground line, if it is detected that the potential of the power line has reached the power supply voltage while the fourth switching element and the fifth switching element are kept off, the first switching element and the second switching element are turned on, and the second switching element is turned off after an elapse of a predetermined time, and if it is detected that the potential of the power line has reached the power supply voltage while the first switching element and the second switching element are kept off, the fourth switching element and the fifth switching element are turned on, and the fifth switching element is turned off after an elapse of a predetermined time.

* * * * *